J. P. WILSON & J. F. JACKSON.
ROTARY VALVE FOR INTERNAL COMBUSTION ENGINES.
APPLICATION FILED AUG. 31, 1915.
1,164,605. Patented Dec. 14, 1915.
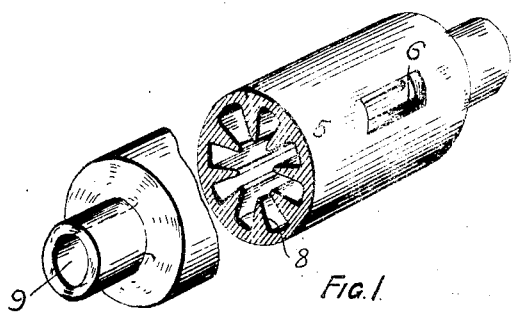
Fig. 1.
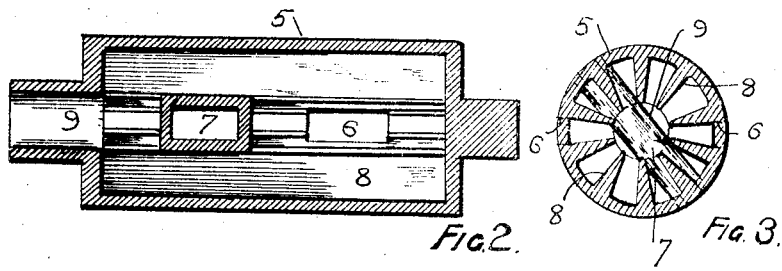 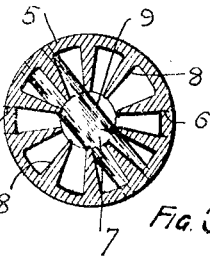
Fig. 2. Fig. 3.
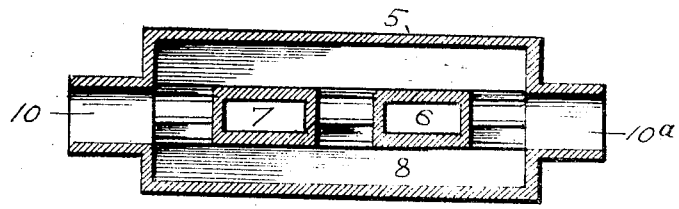
Fig. 4.
Witnesses:
M. E. McDade
Inventors
John P. Wilson
John F. Jackson
by
Attorney

UNITED STATES PATENT OFFICE.

JOHN PALMER WILSON AND JOHN FRAZER JACKSON, OF SYDNEY, NEW SOUTH WALES, AUSTRALIA.

ROTARY VALVE FOR INTERNAL-COMBUSTION ENGINES.

1,164,605.  Specification of Letters Patent.  Patented Dec. 14, 1915.

Application filed August 31, 1915. Serial No. 48,245.

*To all whom it may concern:*

Be it known that we, JOHN PALMER WILSON and JOHN FRAZER JACKSON, subjects of the King of Great Britain, residing at Sydney, in the State of New South Wales, Commonwealth of Australia, have invented certain new and useful Improvements in Rotary Valves for Internal-Combustion Engines, of which the following is a specification.

This invention relates to improvements in rotary valves for internal combustion engines our object being to insure an effective cooling of the valve and prevent the possibility of its seizing.

In the present invention the rotatable cylindrical valve is hollow and is provided internally with a series of fins, flanges or other projections forming a comparatively large metallic radiating surface against which the cool gaseous mixture from the carbureter contacts in its passage therethrough to the cylinder, or air may pass therethrough to the atmosphere again or to or around a carbureter (for heating the petrol or other volatile motive fluid therein). These projections may be formed on the internal periphery of the valve leaving a main passage and subsidiary openings between the projections thereby maintaining the metal, and consequently the external periphery of the valve, cool. But in order that the invention may be clearly comprehended, we now refer to the drawings herewith, in which:—

Figure 1 is a perspective view partly broken away of a rotary valve fitted with our improvements. Fig. 2 is a longitudinal section thereof. Fig. 3 is a cross section. Fig. 4 is a longitudinal section of a modification.

The same numerals indicate the same or like parts.

5 is a hollow cylindrical valve rotatable in a complementary shaped casing, 6 being the inlet port communicating with interior of the valve and 7 a through exhaust passage.

8 represent internal projections in the form of fins.

9 is inlet for gas or gaseous mixture.

In the modification in Fig. 4, 10 is an air inlet for cooling purposes and 10$^A$ the outlet therefor leading to the atmosphere or to or around the carbureter.

In operation (Figs. 1 to 3) the cool gaseous mixture enters the hollow cylinder at 9 and impinges against the surfaces of the internal fins 8 and the outside of the exhaust passage 7 before entering the gas port 6 leading to the engine cylinder by which time a portion of the heat from the fins and exhaust has been transferred to the gas.

In the form illustrated in Fig. 4, both the exhaust and inlet passages 7 and 6 extend through the rotary valve the casing thereof being complementary shaped and on travel of the engine air enters the passage 10 and impinging against the fins and exhaust passage tends to maintain the valve cool before passing out through the opening 10$^A$ which may lead directly to the atmosphere again or to or around a carbureter.

We do not restrict ourselves to the precise shape of fins or projections illustrated.

Having thus described our invention what we claim as new and desire to protect by Letters Patent is:—

A rotary valve for internal combustion engines comprising a cylindrical valve body formed with an intake passage therein extending longitudinally of the body, internal radially extending fins projecting from the walls of said passage and coextensive therewith, and a transverse exhaust passage diametrically extending through the valve and intersecting said intake passage, for the purpose set forth.

In testimony whereof we have hereunto set our hands in presence of two subscribing witnesses.

JOHN PALMER WILSON.
JOHN FRAZER JACKSON.

Witnesses:
 HENRY W. CLARKE,
 H. C. CAMPBELL,